United States Patent [19]

Sato

[11] Patent Number: 4,589,785
[45] Date of Patent: May 20, 1986

[54] PRINTING APPARATUS

[75] Inventor: Masafumi Sato, Fuji, Japan

[73] Assignee: Tokyo Electric Co., Ltd., Tokyo, Japan

[21] Appl. No.: 713,306

[22] Filed: Mar. 18, 1985

[30] Foreign Application Priority Data

Mar. 29, 1984 [JP] Japan .................................. 59-59615

[51] Int. Cl.⁴ ............................. B41J 5/30; B41J 5/46
[52] U.S. Cl. ................................. 400/61; 364/900; 400/76; 400/303; 400/63
[58] Field of Search ................... 400/61, 63, 76, 303, 400/306; 364/200, 900

[56] References Cited

U.S. PATENT DOCUMENTS

| | | | |
|---|---|---|---|
| 3,869,980 | 3/1975 | Schroeder | 400/219.1 X |
| 3,923,138 | 12/1975 | Willcox | 400/280 X |
| 4,086,660 | 4/1978 | McBride | 364/900 |
| 4,137,425 | 1/1979 | Ferroglio | 400/124 X |
| 4,220,417 | 9/1980 | Sprott | 400/279 X |
| 4,223,393 | 9/1980 | Abe | 400/76 X |
| 4,298,773 | 11/1981 | Diab | 178/30 |
| 4,311,399 | 1/1982 | Wegryn | 400/76 |
| 4,452,136 | 6/1984 | Boynton | 400/70 X |

Primary Examiner—Paul T. Sewell

[57] ABSTRACT

A printing apparatus includes a printing unit, an operation panel including a plurality of switches, a first memory, and a control unit which stores the print control data corresponding to the states of the switches of the operation panel into the first memory when a power source is turned on, changes the print control data in this first memory in accordance with an external command, and drives the printing unit in accordance with the input print data and with the print control data in the first memory, thereby printing the input print data. A second memory is provided to store the switch data corresponding to the states of the switches. The control unit compares the states of the switches at the time when the operation mode is changed from the off-line state to the on-line state with the switch data in the second memory, changes only the switch data having the contents different from the states of the switches among the switch data in the second memory in accordance with the states of the switches, and changes only the corresponding print control data in the first memory in accordance with the changed switch data.

3 Claims, 3 Drawing Figures

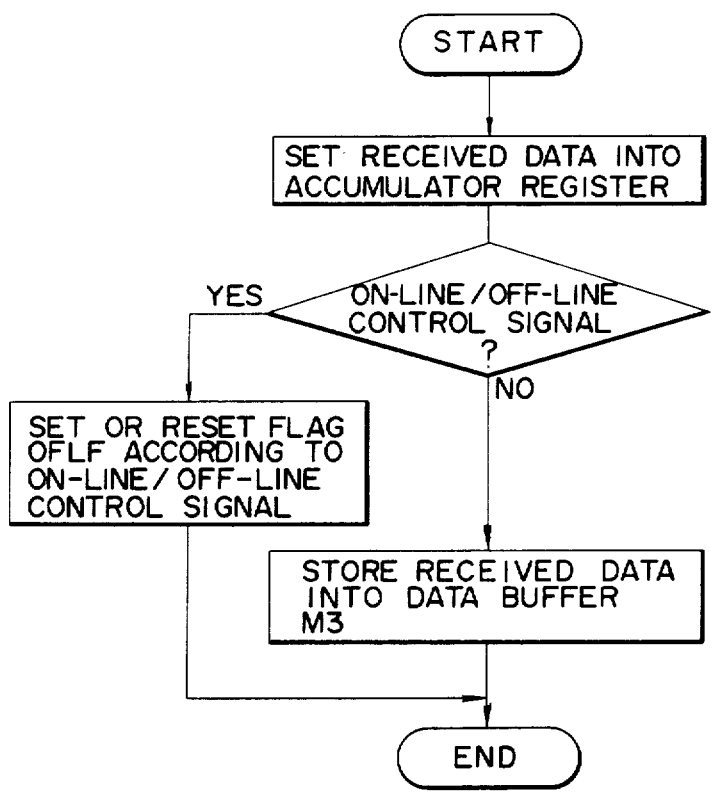
F I G. 3

PRINTING APPARATUS

BACKGROUND OF THE INVENTION

The present invention relates to a printing apparatus in which information regarding the format of print control data including an amount of print pitch, line feed, etc., is set by operating various kinds of switches provided on the operation panel. Alternatively, this information is changed in response to a command from the outside and the printing operation is controlled in accordance with this information.

Hitherto, there is known a printing apparatus in which the switch data corresponding to the states of the various kinds of switches on the operation panel is read only when a power source is turned on, and all of the print control data including the information regarding the automatic line feed, moving amount of a carrier, line feed amount, paper length, etc., are set in accordance with this switch data, and the reading operation is not performed during the operation. Also, in a printing apparatus, when the operation mode changes from the off-line state to the on-line state even during the operation or when a power source is turned on, various kinds of switch data of the operation panel are read and all of the print control data are set in accordance with this switch data. The operation mode is switched from the on-line state to the off-line state when the printing apparatus is set in an error state or not-ready state due to a paper end, cover open of the printing section or the end of an ink ribbon. When the printing apparatus is temporarily disconnected from a host computer to control this printing apparatus by a command from the outside, or when a paper feed is performed by a manual operation of a switch on the operation panel. When these states are recovered to the original states, the operation mode of this printing apparatus is switched from the off-line state to the on-line state. In this kind of printing apparatus, the print control data includes data which can be changed only by a command from the outside and data which cannot be changed by a command but can be changed only by a switch on the operation panel. Thus, in the printing apparatus which can change the information only when the power source is turned on, in order to change the print control data which cannot be changed by the external command, it is required to turn off the power source and then change over the switch, and thereafter turn on the power source again. In addition, when the power source is again turned on, all of the print control data are changed on the basis of the various kinds of switch states of the operation panel; therefore, when the print control data is changed by the command, a command has to be again sent to this printing apparatus from the host computer in order to set this print control data. On the other hand according to the printing apparatus, the print control data is changed when the power source is turned on and when the operation mode is changed to the on-line state. In case of changing the print control data which cannot be changed by the command, there is no need to again turn on the power source. However, when the operation mode is changed from the off-line state to the on-line state, all of the data are changed on the basis of the switch states of the operation panel similarly to the case where the power source is turned on. Consequently, if the print control data is changed by the external command, this print control data has to be changed by again sending the command from the outside.

SUMMARY OF THE INVENTION

It is an object of the present invention to provide a printing apparatus so that when the operation mode is changed from the off-line state to the on-line state, only the necessary print control data is changed and the print control data which has been preliminarily changed by an external command can be held.

This object can be accomplished by a printing apparatus comprising an operation panel including a plurality of switches; first and second memories; and control unit which respectively stores the switch data corresponding to the states of switches and print control data into the first and second memories when a power source is turned on, changes the print control data in the second memory in accordance with an external command, and drives the printing unit in accordance with an input data and with the print control data in the second memory, thereby printing the input print data, in which this control unit further compares switching data corresponding to the states of those switches with the switch data in the first memory when an operation mode was changed from an off-line state to an on-line state, changes the switch data having the contents different from the switching data corresponding to the states of those switches among the switch data in the first memory in accordance with the states of those switches, and changes only the corresponding print control data in the second memory in accordance with the above-mentioned changed switch data.

In this invention, when the operation mode becomes the on-line state, only the switch data and print control data corresponding to the states of the switches which were changed are changed and the contents of the other switch data and print control data are not changed. Therefore, even if the print control data which were changed by an external command are included in the other foregoing print control data, this print control data is kept unchanged, so that it is not necessary to set the print control data by newly supplying a command from the outside to the control unit.

BRIEF DESCRIPTION OF THE DRAWINGS

FIG. 3 is a flow chart for explaining the interrupting operation due to data reception in the printing apparatus shown in FIG. 1.

DETAILED DESCRIPTION OF THE PREFERRED EMBODIMENT

Figure 1:
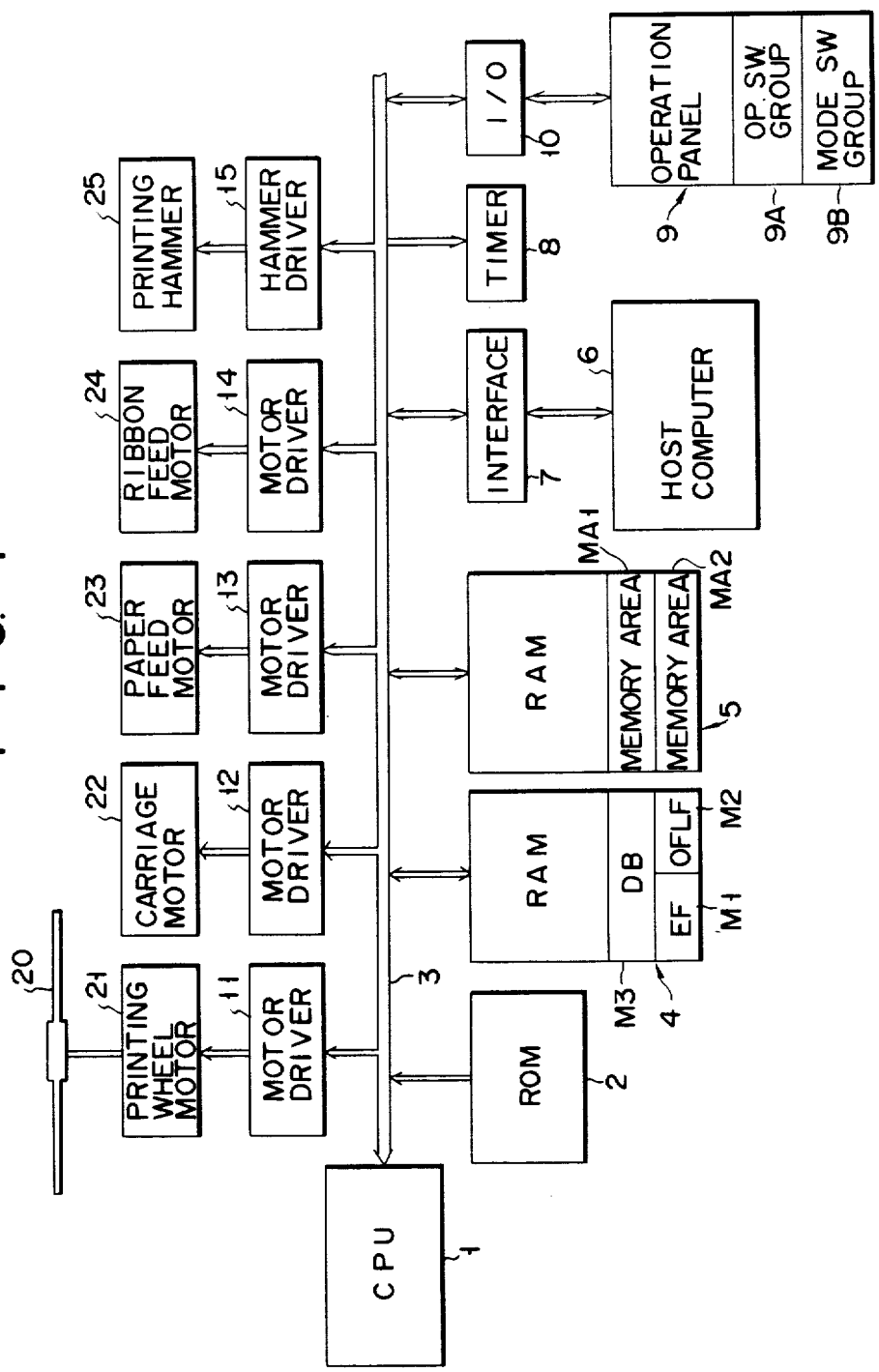
FIG. 1 is a block diagram of a printing apparatus according to one embodiment of the present invention.

FIG. 1 is a block diagram of a printing apparatus according to one embodiment of the present invention. This printing apparatus includes a central processing unit (CPU) 1; a read only memory (ROM) 2, connected to the CPU 1 through a data bus 3, for storing fixed data such as a control program, rotational position data of a printing wheel corresponding to a character code, or the like; a random access memory (RAM) 4, connected to the CPU 1 through the data bus 3, for temporarily storing variable data such as a character code which is inputted from the outside; and a RAM 5, connected to the CPU 1 through the data bus 3, for temporarily storing rotational position data which was read out from the ROM 2. A host computer 6 to supply the character code or command to the CPU 1 is connected through an interface 7 to the CPU 1. A timer 8 is also connected to the CPU 1. On operation panel 9, an operational switch group 9A including a print pitch amount selecting switch, a line feed amount selecting switch and a mode switch group 9B including an ONLINE/OFFLINE selecting switch, an automatic line feed switch are provided. The operation panel 9 is further connected to the CPU 1 through an I/O port 10. In addition, the CPU 1 is connected to supply drive control signals to a wheel motor driver 11, a carriage motor driver 12, a paper feed motor driver 13, a ribbon feed motor driver 14, and a hammer driver 15 which are respectively coupled to a printing wheel motor 21 to rotate a printing wheel 20, a carriage motor 22 to transfer a carriage (not shown) on which the printing wheel 20 is mounted in the printing direction, a paper feed motor 23 which is coupled to a platen and feeds a paper which is set on this platen, a ribbon feed motor 24 to feed a printing ribbon, and a printing hammer 25 to strike a type on the printing wheel which is set at the printing position.

A flag area M1 to store an error flag EF, a flag area M2 to store an off-line flag OFLF and a data buffer M3 are provided in the RAM 4. A first memory area MA1 and a second memory area MA2 are provided in the RAM 5.

Figure 2:
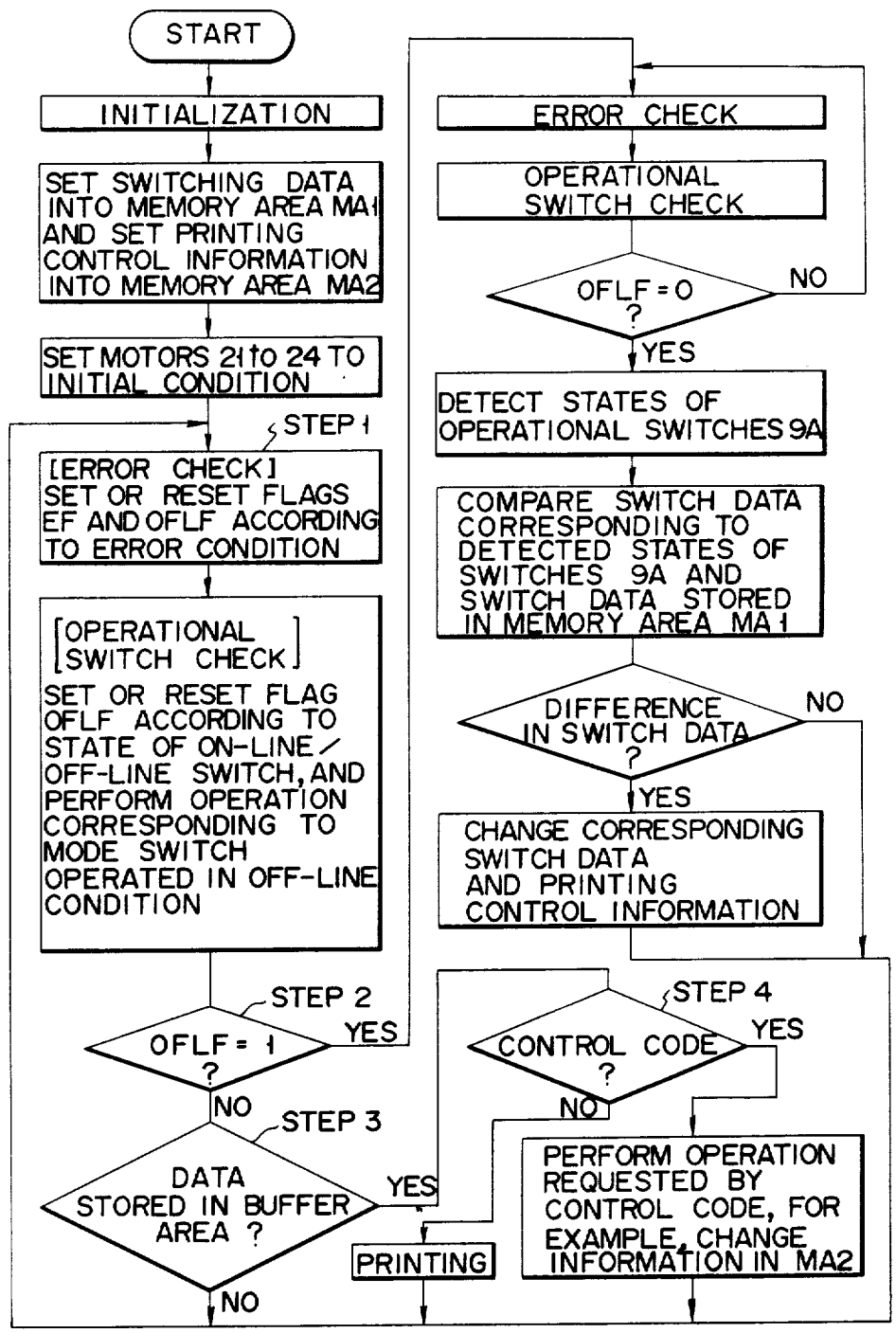
FIG. 2 is a flow chart for explaining the main processing operation of the printing apparatus shown in FIG. 1.

The CPU 1 executes the process upon the power source turn-on and the main processes shown in FIG. 2 on the basis of a program data in the ROM 2. When the power source is turned on, the CPU 1 first initializes the RAMs 4 and 5 and timer 8. Then, the CPU 1 reads the various kinds of switch states of the operational switches 9A and mode switches 9B of the operation panel 9 through the I/O port 10 and sets the switching data corresponding to those switch states into the first memory area MA1. At the same time, the CPU 1 sets the print control data corresponding to the switching data into the second memory area MA2. Next, the CPU 1 supplies drive signals to the motor drivers 11 to 14 to drive the printing wheel motor 21, carriage motor 22, paper feed motor 23, and ribbon motor 24, thereby initializing the condition of the motors 21 to 24. In this state, the CPU 1 transmits a ready signal indicative of the ready state to the host computer 6 through the interface control unit 7 and thereafter, the processing routine advances to the main routine.

In the main routine, the CPU 1 performs the error check, operational switch check, data check, etc. In the error check, in STEP 1, when the CPU 1 determines that an error is detected, for instance, when a hot-ready condition such as a cover open, ribbon end, paper end, etc., is detected, the CPU 1 sets the error flag EF and off-line flag OFLF and temporarily stops the processing operation. When the not-ready condition is cancelled, the CPU 1 resets the flags EF and OFLF and executes the ordinary operation. On the other hand, in the operational switch check, the CPU 1 sets or resets the off-line flag OFLF in dependence upon the state of the on-line/off-line switch of the mode switches 9B. For instance, when it is detected that the line feed switch has been operated in the off-line state, the CPU 1 performs a paper feed control. Next, in STEP 2, the CPU 1 checks if the off-line flag OFLF is set or not. When it is detected that OFLF=0 and the operation mode is in the on-line state, a check is then made in STEP 3 whether the data is stored in the data buffer M3 or not. When it is detected that the data is not stored, the error check is again executed in STEP 1. On the contrary, if the data is stored, a check is made in STEP 4 whether the data is the control code or not. When it is detected that this data is not the control code, the CPU 1 determines that this data is the print data and performs the printing process. Namely, the printing wheel address data corresponding to the print data are transferred from the table of the ROM 2 into the RAM 5. The printing wheel motor 21, carriage motor 22, paper feed motor 23, and ribbon feed motor 24 are driven in accordance with these data, and the printing hammer 25 is driven in the state in that the printing wheel, carriage, paper, and ribbon are set at the position where the next character should be printed, thereby striking the type at the end of the printing wheel. In the case where the data in the data buffer M3 is the control code, the CPU 1 executes the operations required by this code, for instance, rewrites the print control data stored in the second memory MA2 into the RAM 5 and executes the setting of the operation mode, carriage return, line feed and form feed. These processes are repeated as long as the apparatus is in the on-line state. When the operation mode of the printing apparatus changes from the on-line state to the off-line state, the off-line flag OFLF is set to "1", so that the error check and operational switch check are repeatedly performed until it is detected that the operation mode is recovered to the on-line state. When the operation mode is recovered from the off-line state to the on-line state, the CPU 1 detects the various kinds of switch states of the operational switches 9A of the operation panel 9 and stores the switch data corresponding to these detected switch states into its own accumulation register. This switch data is compared with the switch data which was read previously and which has been stored in the first memory area MA1. When it is detected from the result of this comparison that both of these switch data differ, the CPU 1 changes only the different switch data in the first memory area MA1 so as to meet the detected switch data and changes only the corresponding print control data in the second memory area MA2 on the basis of this changed switch data. On one hand, if all of the stored switch data coincide with the detected switch data, this print control data is held as it is and is not changed.

FIG. 3 shows the process of the reception data supplied from the host computer 6 and this process is performed in response to interruption. Namely, when data is received, the data is taken in response to the interruption. Then, this reception data is analyzed and is checked if it is the ON-LINE/OFF-LINE control signal (command) or another data. If it is the ON-LINE/OFF-LINE control signal, the off-line flag OFLF is set or reset on the basis of the content of this signal. In case of another data, it is stored in the data buffer M3.

In the apparatus of the embodiment of the invention constituted in this way, the states of the operation switches 9A of the operation panel 9 are read when the power source is turned on and the switch data corresponding to the switch states are set into the first memory area MA1, and at the same time the print control data is set into the second memory area MA2 corresponding to the switch data in the first memory area MA1. On one hand, when the operation mode is switched from the on-line state to the off-line state and thereafter it is recovered to the on-line state, the switch states of the operational switches 9A are read and the switch data corresponding to the switch states are compared with the switch data which was read previously and which has been stored in the first memory area MA1. If they are the different switch data, the switch data in the first memory area MA1 relative to only the different switch data is changed, and at the same time the print control data in the second memory area MA2 corresponding to the different switch data is changed on the basis of the changed switch data. In the case where the switch state of at least one of the operational switches 9A is changed during the operation, the changes of the switch data and print control data due to the change of the switch state are carried out when the operation mode becomes the off-line state and thereafter becomes the on-line state. In addition, in this case, only the print control data relative to the switch or switches whose switch states were changed in the operational switch group 9A is changed. The other print control data is kept unchanged. Therefore, if the print control data is changed by the command from the computer, this print control data is kept unchanged. Thus, there is no need to perform the troublesome operation such as to set this print control data again by generating a command and its handling is simple.

The present invention has been described above with respect to one embodiment; however, the invention is not limited to only this embodiment. For instance, in FIG. 1, the RAMs 4 and 5 are used, but these RAMs 4 and 5 may be formed as one RAM.

On one hand, when the operation mode is changed from the off-line state to the on-line state, the switch data corresponding to the states of the switches of the operation panel 9 can be stored into the memory area MA1 after being compared with the switch data stored previously in this memory area MA1, and then only the corresponding print control data can be changed in accordance with the switch data whose content was changed.

What is claimed is:

1. A printing apparatus comprising:

printing means;
    an operation panel including a plurality of switches;
    memory means having first and second memories; and
    control means which respectively stores switch data corresponding to the states of the switches of said operation panel and print control data into said first and second memories when a power source is turned on, changes the print control data in said second memory in accordance with a command, and drives said printing means in accordance with an input print data and with the print control data stored into said second memory, thereby printing said input print data,
    wherein said control means comparing the states of said switches at the time when an operation mode is changed from an off-line state to an on-line state with the switch data in said first memory, changes the switch data having the contents different from the states of said switches among the switch data in said first memory in accordance with the states of said switches, and changes only the corresponding print control data in said second memory in accordance with said changed switch data.

2. A printing apparatus according to claim 1, wherein said memory means further has a third memory to store the data representing that the operation mode is in the on-line state or off-line state, and when it is detected that the operation mode was changed from the off-line state to the on-line state in accordance with the data in said third memory, said control means executes said comparing operation.

3. A printing apparatus according to claim 2, wherein said memory means further has a fourth memory and when a not-ready condition is detected, said control means stores the data corresponding to said not-ready condition into said fourth memory and stores the data indicative of said off-line state into said third memory and stops the processing operation.

* * * * *